(12) United States Patent
Mashey

(10) Patent No.: US 6,471,478 B1
(45) Date of Patent: Oct. 29, 2002

(54) AXIAL SEAL SYSTEM FOR A GAS TURBINE STEAM-COOLED ROTOR

(75) Inventor: Thomas Charles Mashey, Anderson, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/694,756

(22) Filed: Oct. 24, 2000

Related U.S. Application Data

(63) Continuation of application No. 09/332,330, filed on Jun. 14, 1999, now abandoned.

(51) Int. Cl.$^7$ .............................. F01D 5/08; F01D 5/18

(52) U.S. Cl. ............... 416/96 R; 416/96 A; 416/198 A; 416/201 R; 415/114; 415/116; 415/134; 415/135; 285/187; 285/917; 277/603; 277/608; 277/609; 277/619; 277/626; 277/644

(58) Field of Search .................... 277/603, 608, 277/609, 619, 626, 644; 415/114, 115, 116, 134, 135; 416/198 A, 201 R, 95, 96 R, 96 A, 97 R; 205/184, 349, 917

(56) References Cited

U.S. PATENT DOCUMENTS

| 1,073,916 A | 9/1913 | Ljungstrom | 415/135 |
| 1,799,834 A | 4/1931 | Waterman | 277/626 |
| 4,318,668 A | 3/1982 | Chaplin et al. | 415/135 |
| 4,720,236 A | 1/1988 | Stevens | 416/134 |
| 5,593,274 A | 1/1997 | Carreno et al. | 415/115 |
| 5,695,319 A | 12/1997 | Matsumoto et al. | 416/95 |

FOREIGN PATENT DOCUMENTS

| NL | 6805184 | 10/1968 | 285/917 |

OTHER PUBLICATIONS

"39$^{th}$ GE Turbine State-of-the-Art Technology Seminar", Tab 1, ""F" Technology –the First Half-Million Operating Hours", H.E. Miller, Aug. 1996.

"39th GE Turbine State-of-the-Art Technology Seminar", Tab 2, "GE Heavy-Duty Gas Turbine Performance Characteristics", F. J. Brooks, Aug. 1996.

"39th GE Turbine State-of-the-Art Technology Seminar", Tab 3, "9EC 50Hz 170-MW Class Glass Turbine", A. S. Arrao, Aug. 1996.

"39th GE Turbine State-of-the-Art Technology Seminar", Tab 4, "MWS6001FA –An Advanced-Technology 70-MW Class 50/60 Hz Gas Turbine", Ramachandran et al., Aug. 1996.

"39th GE Turbine State-of-the-Art Technology Seminar", Tab 5, "Turbomachinery Technology Advances at Nuovo Pignone", Benvenuti et al., Aug. 1996.

"39th GE Turbine State-of-the-Art Technology Seminar", Tab 6, "GE Aeroderivative Gas Turbines –Design and Operating Features", M.W. Horner, Aug. 1996.

"39th GE Turbine State-of-the-Art Technology Seminar", Tab 7, "Advanced Gas Turbine Materials and Coatings", P.W. Schilke, Aug. 1996.

(List continued on next page.)

Primary Examiner—Christopher Verdier
(74) Attorney, Agent, or Firm—Nixon & Vanderhye

(57) ABSTRACT

An axial seal assembly is provided at the interface between adjacent wheels and spacers of a gas turbine rotor and disposed about tubes passing through openings in the rotor adjacent the rotor rim and carrying a thermal medium. Each seal assembly includes a support bushing for supporting a land of the thermal medium carrying tube, an axially registering seat bushing disposed in the opposed opening and a frustoconical seal between the seal bushing and seat. The seal bushing includes a radial flange having an annular recess for retaining the outer diameter edge of the seal, while the seat bushing has an axially facing annular surface forming a seat for engagement by the inner diameter edge of the seal.

7 Claims, 8 Drawing Sheets

OTHER PUBLICATIONS

"39th GE Turbine State–of–the–Art Technology Seminar", Tab 8, "Dry Low $NO_X$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al., Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R.C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J.F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 –Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993 –Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos.DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H. Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency", Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al. pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar. 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century –"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al. pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_X$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting". "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual PRogram Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine –High Efficiency, Low Cost of Electricity and Low Emissions", Roger Schonewald and Patrick Marolda, (no date available).

"Testing Program Results Validate GE's H Gas Turbine –High Efficiency, Low Cost of Electricity and Low Emissions", Slide Presentation –working draft, (no date available).

"The Next Step In H. . . For Low Cost per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31776—5628.

"Utility Advanced Turbine Systems (ATS) Technology Readiness Testing —Phase 3", Document #666274, Oct. 1, 1996–Sep. 30, 1997, Publication Date, Dec. 31, 1997, Report Numbers: DOE/MC/31176 — 10.

"Utility Advanced Turbine System (ATS) Technology Readiness Testing and Pre–Commercial Demonstration, Phase 3", Document #486029, Oct. 1 –Dec. 31, 1995, Publication Date, May 1, 1997, Report Numbers: DOE/MC/31176 — 5340.

"Utility Advanced Turbine System (ATS) Technology Readiness Testing and Pre–Commercial Demonstration –Phase 3", Document #486132, Apr. 1 –Jun. 30, 1976, Publication Date, Dec. 31, 1996, Report Numbers: DOE/MC/31176—5660.

"Utility Advanced Turbine System (ATS) Technology Readiness Testing and Pre–Commercial Demonstration —Phase 3", Document #587906, Jul. 1 –Sep. 30, 1995, Publication Date, Dec. 31, 1995, Report Numbers: DOE/MC/31176—5339.

"Utility Advanced Turbine System (ATS) Technology Readiness Testing and Pre–Commercial Demonstration" Document #666277, Apr. 1 –Jun. 30, 1997, Publication Date, Dec. 31, 1997, Report Numbers: DOE/MC/31176—8.

"Utility Advanced Turbine System (ATS) Technology Readiness Testing and Pre–Commercialization Demonstration" Jan. 1 –Mar. 31, 1996, DOE/MC/31176—5338.

"Utility Advanced Turbine System (ATS) Technology Readiness Testing: Phase 3R", Document #756552, Apr. 1 –Jun. 30, 1999, Publication Date, Sep. 1, 1999, Report Numbers: DE—FC21 –95MC31176–23.

"Utility Advanced Turbine System (ATS) Technology Readiness Testing.", Document #656823, Jan. 1 –Mar. 31, 1998, Publication Date, Aug. 1, 1998, Report Numbers: DOE/MC/31176–17.

"Utility Advanced Turbine Systems (ATS) Technology Readiness Testing and Pre–Commercial Demonstration", Annual Technical Progress Report, Reporting Period: Jul. 1, 1995 –Sep. 30, 1996.

"Utility Advanced Turbine Systems (ATS) Technology Readiness Testing", Phase 3R, Annual Technical Progress Report, Reporting Period: Oct. 1, 1997 –Sep. 30, 1998.

"Utility Advanced Turbine Systems (ATS) Technology Readiness Testing", Document #750405, Oct. 1 –Dec. 30, 1998, Publication Date: May, 1, 1999, Report Numbers:DE–FC21–95MC31176–20.

"Utility Advanced Turbine Systems (ATS) Technology Readiness Testing", Document #1348, Apr. 1 –Jun. 29, 1998, Publication Date Oct. 29, 1998, Report Numbers DE–FC21–95MC31176—18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1 –Mar. 31, 1997, Document #666275, Report Numbers: DOE/MC/31176–07.

"Proceedings of the 1997 Advanced Turbine Systems", Annual Program Review Meeting, Oct. 28–29, 1997.

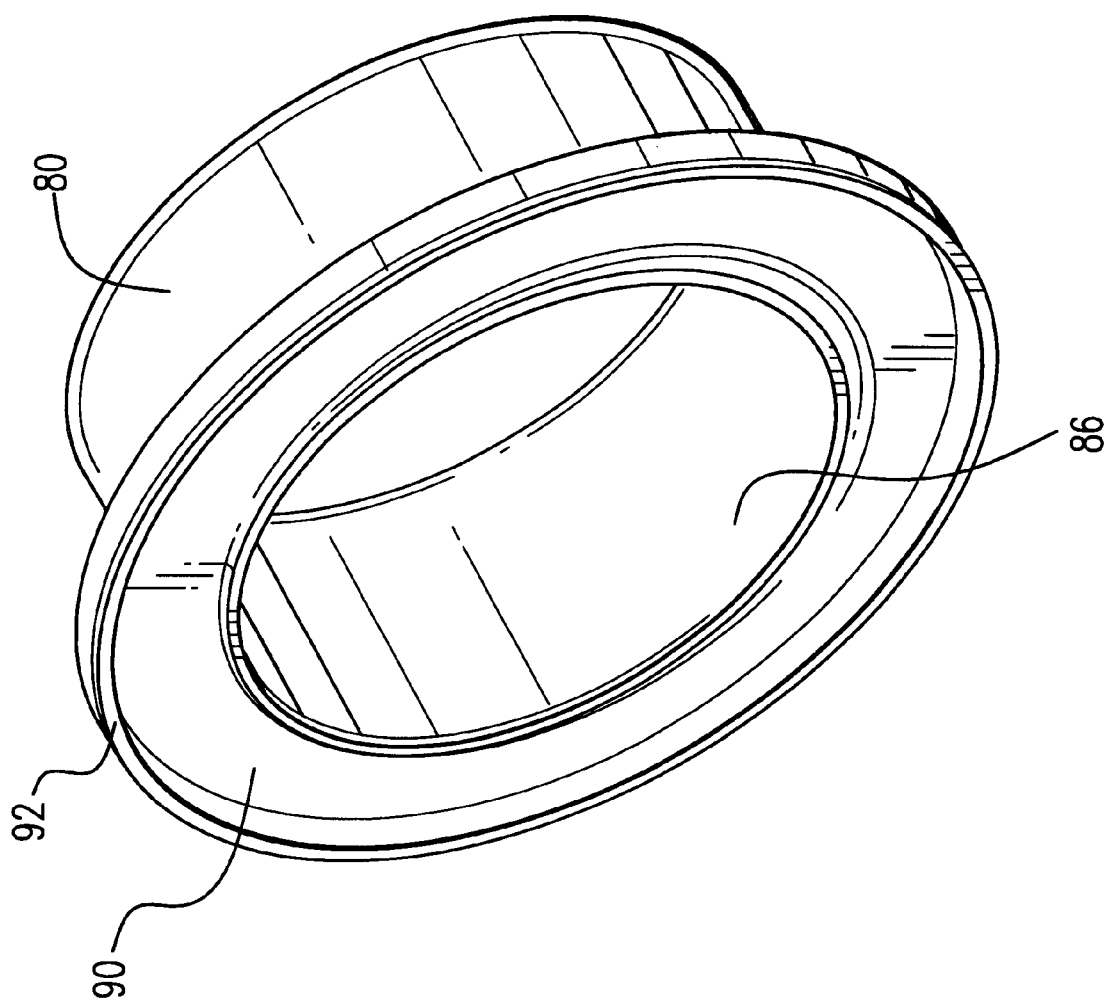

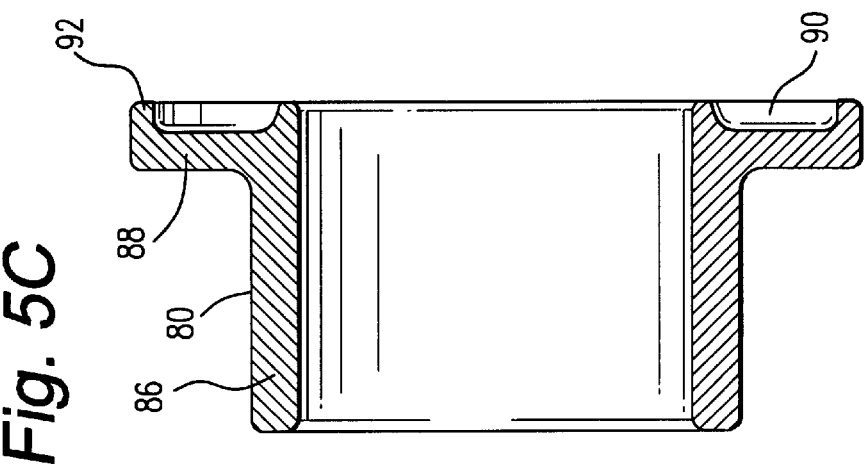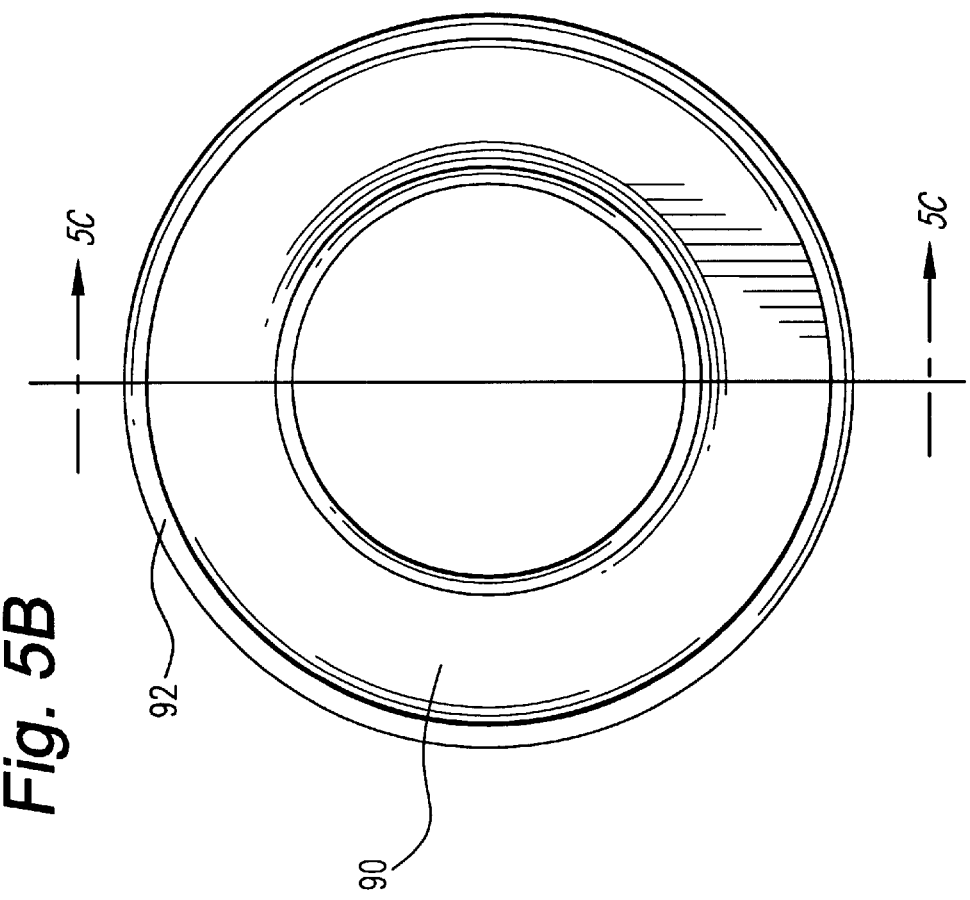

AXIAL SEAL SYSTEM FOR A GAS TURBINE STEAM-COOLED ROTOR

This application is a continuation of application Ser. No. 09/332,330, filed Jun. 14, 1999, now abandoned, the entire content of which is hereby incorporated by reference in this application.

This invention was made with Government support under Contract No. DE-FC21-95MC31176 awarded by the Department of Energy. The Government has certain rights in this invention.

TECHNICAL FIELD

The present invention relates to a gas turbine having a rotor with buckets cooled by a thermal medium supplied and returned in generally axial directions along and adjacent the rim of the rotor and particularly relates to seal assemblies for axially sealing tubes carrying the thermal medium at junctures between axially stacked wheels and spacers to seal between cavities insulating the tubes from the wheels and spacers and cavities surrounding the joints between the wheels and spacers.

BACKGROUND OF THE INVENTION

In gas turbines, the rotor is typically formed of axially stacked wheels and spacers bolted together in alternating relationship with one another. The wheels mount circumferentially-spaced buckets about their periphery, while the spacers lie in radial opposition to nozzles, the buckets and nozzles forming part of and residing in the hot gas path in which the products of combustion flow, rotating the rotor about its axis.

In more advanced designs of gas turbines, the buckets of the first stage and preferably the first and second stages are cooled by a thermal medium which passes axially through a bore tube assembly, outwardly in radial supply tubes in the aft disk of the rotor and forwardly through a plurality of axially extending, circumferentially-spaced tubes passing through aligned openings in the stacked wheels and spacers. The spent cooling medium is returned from the first and second stages along the rim of the rotor to the aft disk by a plurality of circumferentially-spaced return tubes in communication with radial return tubes for returning the thermal medium to the bore tube assembly. It has been determined that as the rotor structure heats up during turbine start-up, the wheel and spacer rim areas move closer together due to the temperature changes. That is, the rims of the rotor heat up faster than the interior portions of the rotor where the tie bolts are located such that the rims of the wheels and spacers move toward one another. This phenomena is known as rotor clap. As the rotor structure approaches steady-state operating temperatures, this rotor clap diminishes and eventually disappears. It is essential, however, during both start-up and steady-state operations, that the seals between the cavities surrounding the tubes within the wheel and spacer openings and cavities surrounding the seal are maintained. As a consequence of these requirements, there has developed a need for a seal that is sufficiently compliant to absorb significant compressive displacement forces caused by rotor thermal growth during start-up, yet sufficiently stiff to resist substantial transverse centrifugal forces during steady-state operation. Moreover, the seal must return to its original assembled position as the compressive displacement forces are removed and the turbine approaches steady-state operation. The seal must therefore be sufficiently robust in the radial direction to support itself under high centrifugal loadings.

BRIEF SUMMARY OF THE INVENTION

In accordance with a preferred embodiment of the present invention, there is provided a seal assembly for location between axially opposed faces of the wheels and spacers of the gas turbine rotor assembly and about the thermal medium carrying tubes. The seal assemblies effectively seal between the cavities in the wheels and spacers openings about the tubes and cavities external to the seals between the registering faces of the wheels and spacers while accommodating high compressive stresses during turbine start-up and high centrifugal loadings during steady-state operation. The present seal between the cavities surrounding the tubes and the cavities surrounding the seals prevents the medium in the cavities surrounding the seals, the preferred medium being bore cooling air, from entering into or exiting from the cavities surrounding the tubes. Air transfer between cavities would induce a flow through the cavities surrounding the tubes, which would then greatly increase heat transfer from the tubes to the wheels and spacers. Increased heat transfer from the tubes to the wheels and spacers contributes to rotor failure. To accomplish the foregoing, the present invention provides a seal assembly comprising a support bushing, a seal element and a seat bushing. Each support bushing is carried by a spacer adjacent an end face thereof and provides a support for the lands of the thermal medium carrying tube. The support bushing has a radially outwardly directed flange in the region of the interface between the wheels and spacers. The seat bushing is disposed in the axially registering opening through the end face of the opposed wheel and has a radial flange mounting an annular axially facing bearing surface. A frustoconical seal element extends between the support bushing and the seat bushing. Preferably, the larger diameter of the seal element bears in a recess of the seal bushing and the inner smaller diameter edge bears against the annular bearing surface of the seat bearing. A retainer flange or stop is formed along the outer margin of the flange of the support bushing to provide support for the seal element upon axial movement of the wheel and spacer toward one another whereby high compressive forces may be absorbed. As the turbine moves toward steady-state operation, the rotor clap diminishes and the seal returns to its original assembled condition. In that condition, the seal element is stiff in a radial direction to absorb the high centrifugal field caused by rotor rotation.

In a preferred embodiment according to the present invention, there is provided in a gas turbine having a rotor comprised of axially stacked rotor wheels and spacers and aligned openings spaced from an axis of rotation of the rotor, the aligned wheels and spacers receiving a tube extending in an axial direction, a seal assembly about the tube at an interface of one of the wheels and one of the spacers, comprising a generally annular seal support in part received in a first opening in one of the wheels and spacers and including a generally radially extending flange having an annular recess in axial registration with an opposed face of another of the wheel and spacers, a seat bushing in part received in a second opening of another wheel and spacer in axial opposition to the first opening and having an seat and a seal between the seal support and the bushing, the seal including an annular frustoconically-shaped element having a radially outer edge portion engaging the seal support in the recess thereof and a radially inner edge portion engaging the seat for sealing between the seal support and the seat.

BRIEF DESCRIPTION OF THE DRAWINGS

FIG. 5A is a perspective view of a support bushing forming part of the seal assembly of FIG. 4;

FIG. 5B is an axial end view of the support bushing;

FIG. 5C is a cross-sectional view thereof taken about on line 5C—5C in FIG. 5B;

DETAILED DESCRIPTION OF THE INVENTION

Figure 1:
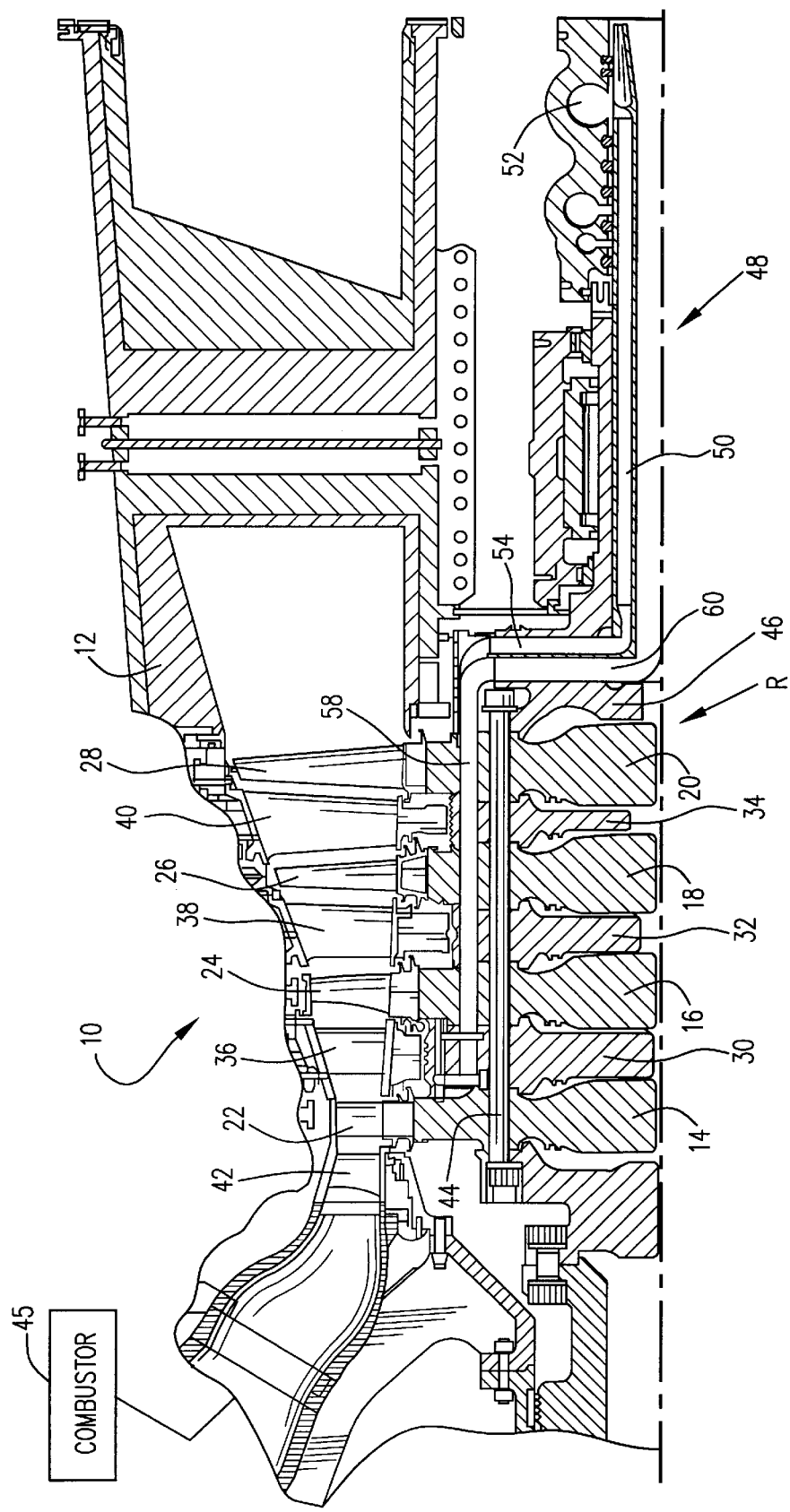
FIG. 1 is a cross-sectional view of a portion of a gas turbine illustrating a turbine section and the thermal medium carrying tubes for supplying cooling thermal medium to buckets.

Referring to FIG. 1, there is illustrated a turbine section incorporating the present invention. The turbine section 10 includes a turbine housing 12 surrounding a turbine rotor R. Rotor R includes in the present example four successive stages represented by wheels 14, 16, 18 and 20, carrying a plurality of circumferentially spaced buckets or blades 22, 24, 26 and 28, respectively. The wheels are arranged alternately between spacers 30, 32 and 34. The outer rims of spacers 30, 32 and 34 lie in radial registration with a plurality of stator blades or nozzles 36, 38 and 40, the first set of nozzles 42 lying forwardly of the first stage buckets 22. Consequently, it will be appreciated that a four-stage turbine is illustrated wherein the first stage comprises nozzles 42 and buckets 22; the second stage, nozzles 36 and buckets 24; the third stage, nozzles 38 and 26 and, finally, the fourth stage, nozzles 40 and buckets 28. The rotor wheels and spacers are secured one to the other by a plurality of circumferentially spaced bolts 44 which pass through aligned openings in the wheels and spacers. A plurality of combustors, one being illustrated at 45, are arranged about the turbine section to provide hot gases of combustion through the hot gas path of the turbine section in which the nozzles and buckets are located for rotating the rotor. The rotor also includes an aft disk 46 formed integrally with a bore tube assembly, generally designated 48.

Figure 2:
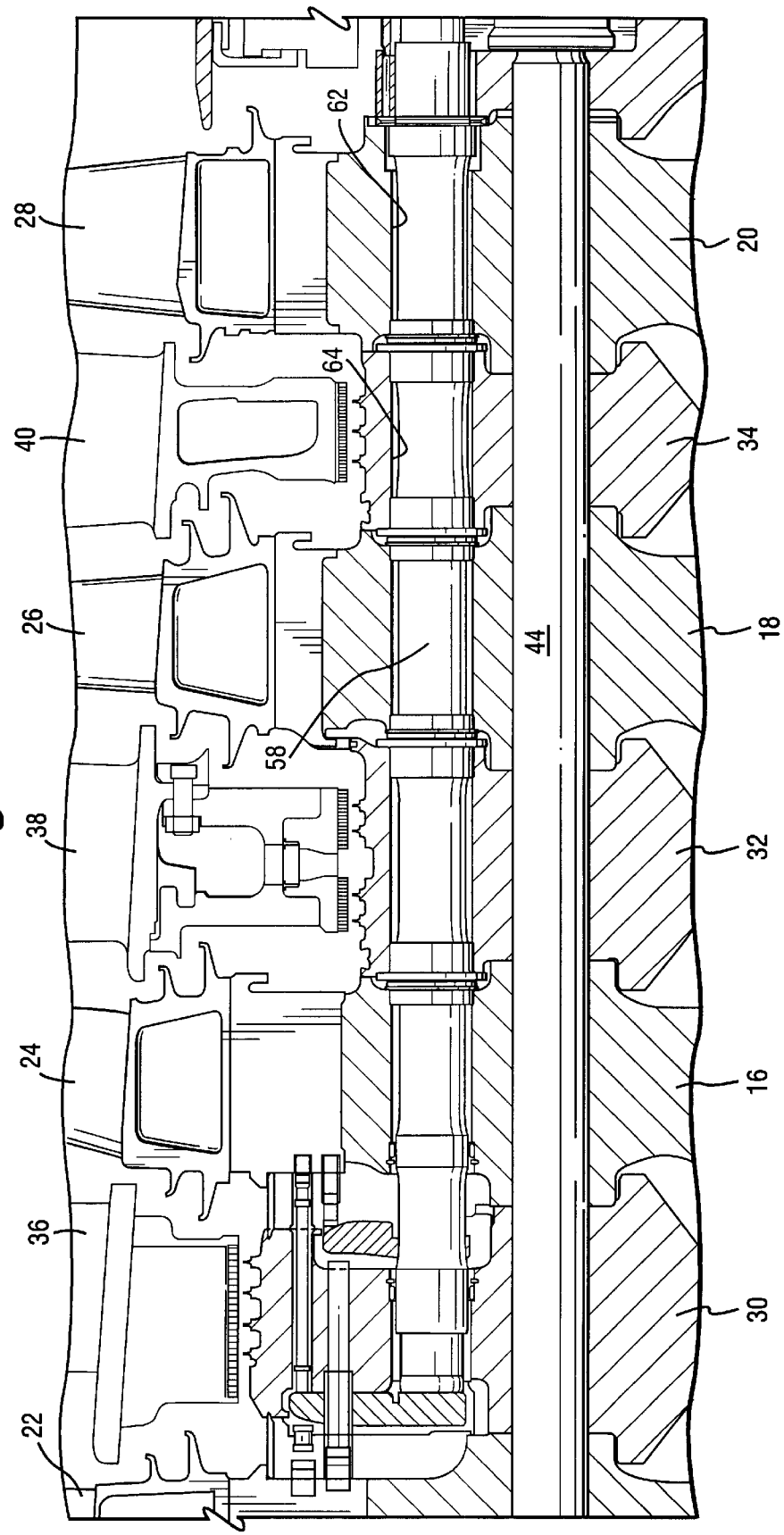
FIG. 2 is a fragmentary perspective view of portions of the turbine stages of FIG. 1 with parts in cross-section and illustrating the location of seal assemblies according to the present invention.

At least one and preferably both of the buckets 22 and 24 of the first two stages are provided with a thermal medium for cooling, the thermal medium preferably being cooling steam. Cooling steam is provided and returned through the bore tube assembly 48. With reference to FIGS. 1 and 2, and in a preferred embodiment, the bore tube assembly includes an annular passage 50 supplied with cooling steam, from a steam plenum 52 for flow to a plurality of radially extending supply tubes 54 provided in the aft disk 46. Tubes 54 communicate with circumferentially spaced, axially extending thermal medium supply tubes 56 in communication with cooling passages, not shown, in the first and second-stage buckets. Spent or returned cooling steam at an elevated temperature flows from the first and second-stage buckets through a plurality of circumferentially spaced, axially extending thermal medium return tubes 58. Return tubes 58 communicate at their aft ends with radially inwardly extending return tubes 60 which, in turn, flow into the central bore of the bore tube assembly 48 for returning the cooling medium to a supply or to steam turbines for use in a combined-cycle system.

It will be appreciated from the foregoing description that the axially extending supply and return tubes 56 and 58, respectively, lie adjacent the rim of the rotor. Also, each supply and return tube extends through axially aligned openings 62 and 64 through the axially stacked wheels and spacers, respectively.

Figure 3:
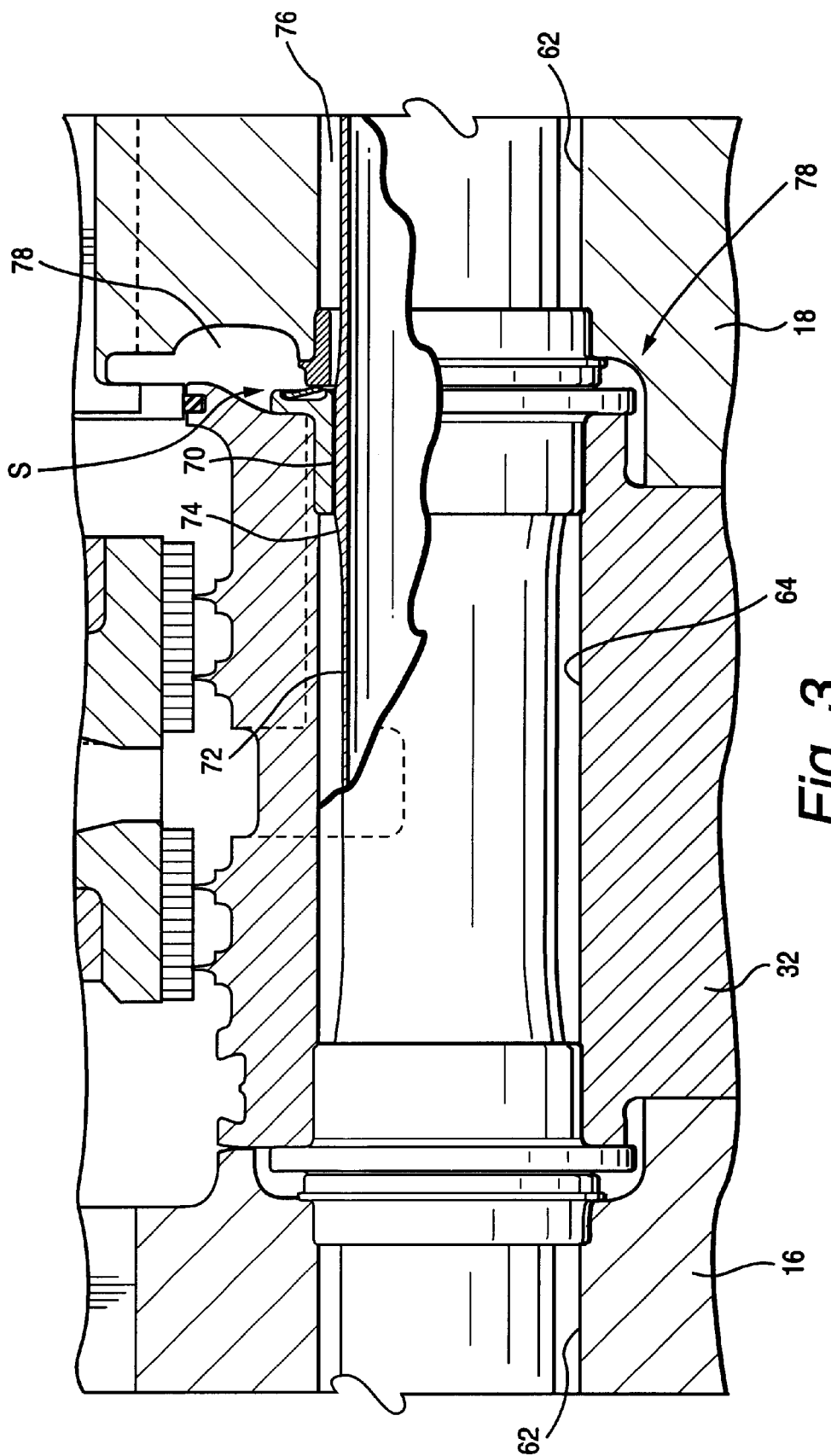
FIG. 3 is an enlarged cross-sectional view of a portion of a thermal medium carrying tube illustrating the seal assemblies between opposed faces of a spacer and a wheel.

Referring to FIGS. 2 and 3, a return tube 58 is illustrated. The supply and return tubes are similar, except as otherwise noted, and a description of one will suffice as a description of the other for purposes of describing the seal assembly hereof. Each tube comprises a thin-walled structure having a plurality of raised lands 70 at axially spaced locations along the length of the tube. The axial locations of the lands 70 coincide with the locations of support bushings of the seal assemblies hereof disposed in part in the openings through the wheels and spacers. Between the lands are thin-walled sections 72 of the tubes. From a review of FIG. 3, it will be appreciated that the outer exterior surfaces of the lands 70 are radially outwardly of the exterior surface of the thin-walled sections 72. Transition sections 74 having outer arcuate surfaces are provided between each land 70 and an adjacent thin-walled section 72. Note that the tubes are spaced radially inwardly from the cylindrical surfaces of the openings through the wheels and spacers and thereby define insulation cavities 76. Seal assemblies, generally designated S, are provided at the interface of axially adjacent wheels and spacers to seal between cavities 76 and the respective cavities 78 between the wheels and the spacers surrounding the tubes. As illustrated in FIG. 2, four seal assemblies are provided for the return tube and lie at the interfaces of the wheel 16, spacer 32; spacer 32 and wheel 18; wheel 18 and spacer 34; and spacer 34 and wheel 20.

Figure 4:
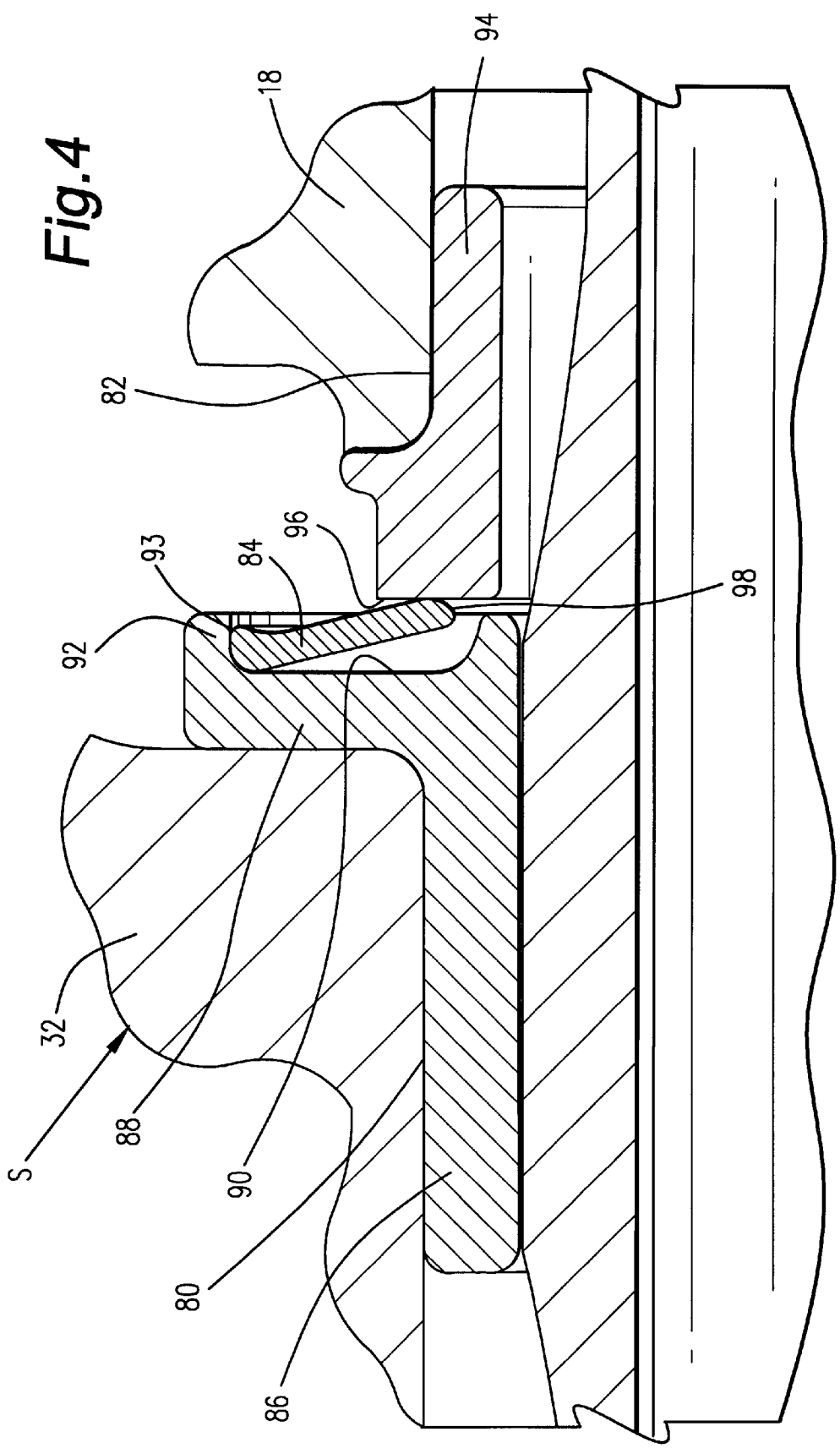
FIG. 4 is an enlarged fragmentary cross-sectional view of a preferred embodiment of seal assembly according to the present invention.

Each seal assembly S includes, in accordance with a preferred form of the present invention and referring to FIG. 4, a seal support, preferably a support bushing 80, a seat bushing 82 and a seal 84. Each support bushing 80 includes a sleeve 86 received in a counterbore of its associated spacer 32 formed in the opening 64. Each support bushing 80 also lies at an axial location coincident with a land 70 of the tube and provides support for the tube at that axial location. Referring particularly to FIGS. 5A–5C, bushing 80 has a radially outwardly directed flange 88 adjacent an end of the sleeve 86 which lies axially beyond the counterbore of opening 64. The axial end face of flange 88 also includes an annular recess 90 for receiving an outer diameter edge of the seal 84. The outer margin 92 of flange 88 serves as a stop for the seal 84 as described below.

Figure 7A:
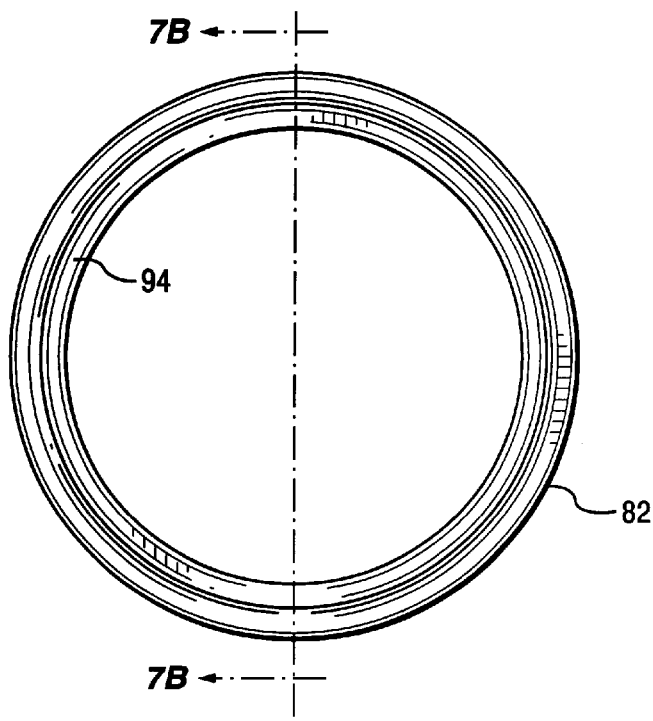
FIG. 7A is an axial end view of a seat bushing forming part of the seal assembly hereof.
Figure 7B:
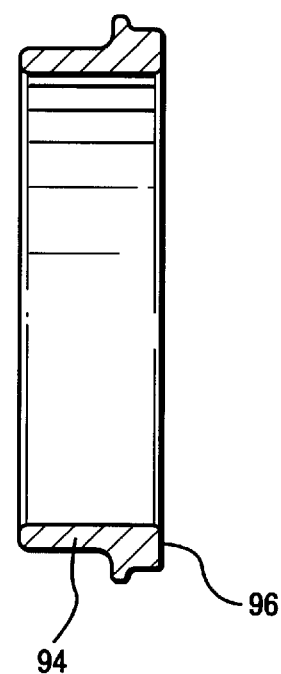
FIG. 7B is a cross-sectional view thereof taken about on line 7B—7B in FIG. 7A.
Figure 7C:
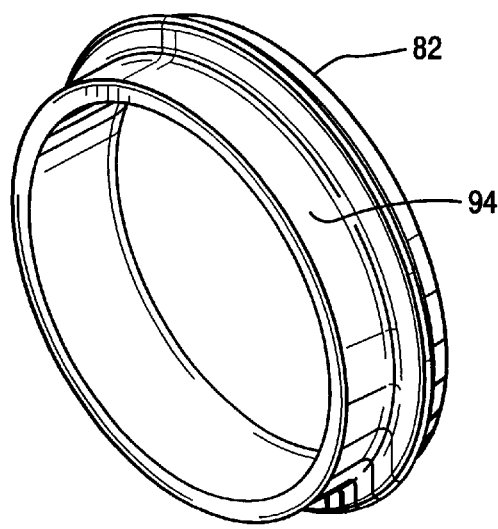
FIG. 7C is a perspective view of the seat bushing.

The seat bushing 82 illustrated in FIGS. 7A–7C includes a sleeve 94 having an interior diameter greater than the interior diameter of the sleeve 86 of support bushing 80. As illustrated in FIG. 3, the land 70 transitions to the thin-wall section 72 such that the thin-wall section 72 lies within and is spaced from the seat bushing 82. Seat bushing 82 includes an enlarged radial flange mounting an axially facing bearing surface 96 in axial opposition to the flange 88 of bushing 80. Bearing surface 96 serves as a seat for the inner diameter edge 98 of the seal 84.

Figure 6A:
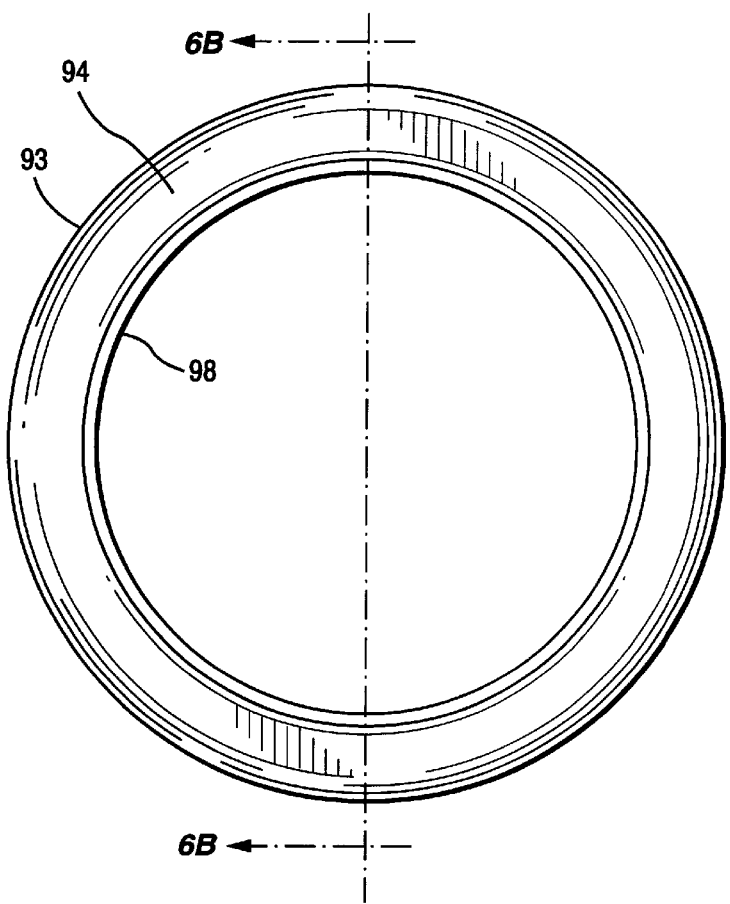
FIG. 6A is an axial end view of a sealing element employed with the seal assembly hereof.
Figure 6B:
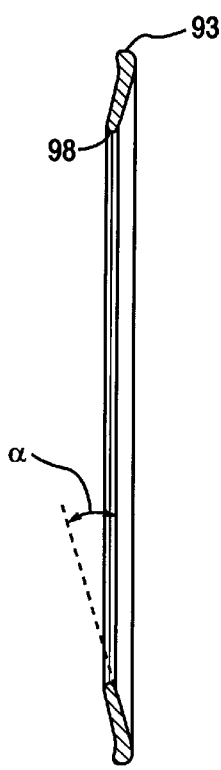
FIG. 6B is a cross-sectional view thereof taken generally about on line 6B—6B of FIG. 6A.
Figure 6C:
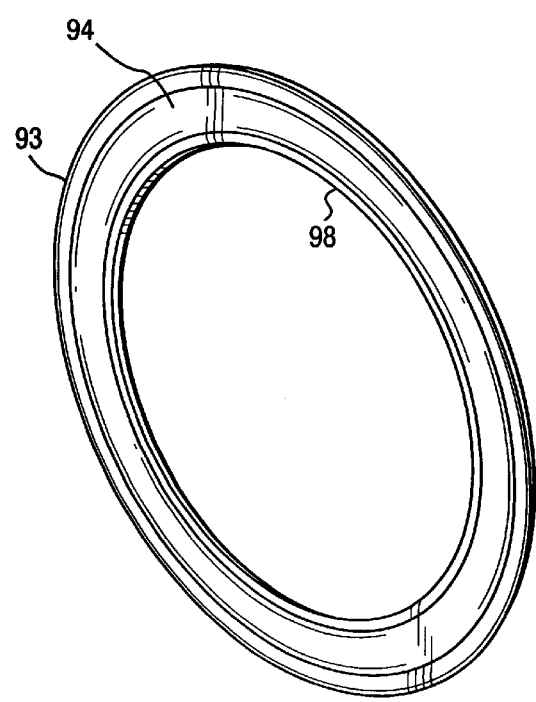
FIG. 6C is a perspective view of the seal element of FIG. 6A.

Referring to FIGS. 6A–6C, the seal 84 comprises a shallow, frustoconical section extending between its inner diameter 98 and the outer diameter 93. The angle α made along the inside face of the seal element 84 and a plane perpendicular to the rotor axis is about 13° and lies within a range of 10–15°. Thus, the angle is shallow.

From a review of FIG. 4, it will be appreciated that the support bushing 80 and seat bushing 82 are axially spaced one from the other upon initial assembly. Seal 84 lies within annular recess 90 with its outer diameter edge lying within the recess and bearing against the outer stop or flange 92. The inner diameter edge 98 bears against the annular seat 96 with a compressive force. During turbine start-up, the wheels and spacers have a tendency when heated to move toward one another responsive to thermal growth of the rotor. The significant compressive forces tending to displace the bushings toward one another are absorbed by the seal element. After start-up and as the turbine approaches steady-state operation, the seal assembly moves back to its original assembled condition. During steady-state operation, however, high centrifugal loads are applied to the rims of the turbine rotor and, hence, to the seals. The frustoconical annular shape of the seal assemblies, however, provide sufficient stiffness to withstand these high centrifugal loads, while simultaneously serving their function as seals.

It will be appreciated that the support bushings and seat bushings are not necessarily mounted in counterbores of the spacers and wheels, respectively. The wheels and spacers could mount the support bushings and seat bushings, respectively. Also, while the seal assemblies are illustrated as lying between the second stage wheel 16 and spacer 32; spacer 32 and third stage wheel 18; wheel 18 and spacer 34; and spacer 34 and fourth stage wheel 20, it will be appreciated that the seal assemblies could be applied at other locations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a gas turbine having a rotor comprised of axially stacked rotor wheels and spacers and aligned openings spaced from an axis of rotation of the rotor, the aligned wheels and spacers receiving a tube extending in an axial direction, a seal assembly about said tube at an interface of one of said wheels and one of said spacers, comprising:

a generally annular seal support in part received in a first opening in one of said wheels and spacers and including a generally radially extending flange having an annular recess in axial registration with an opposed face of another of said wheel and spacers;

a seat bushing in part received in a second opening of said another wheel and spacer in axial opposition to said first opening and having a seat; and a seal between said seal support and said bushing, said seal including an annular frustoconically-shaped element having a radially outer edge portion engaging said seal support in said recess thereof and a radially inner edge portion engaging said seat for sealing between said seal support and said seat.

2. A seal assembly according to claim 1 wherein said support has a radially outer flange about said recess projecting toward said another wheel and spacer forming an outer limiting stop for said seal.

3. A seal assembly according to claim 1 wherein one of said seal support and said seal bushing supports said tube.

4. A seal assembly according to claim 3 wherein another of said seal support and said bushing is spaced from said tube.

5. A seal assembly according to claim 1 wherein one of said seal support and said seal bushing supports said tube and another of said seal support and said seal bushing is spaced from said tube, said radially inner edge portion of said seal bearing against an annular bearing surface of said seat bushing in axial opposition to said seal support enabling said seal for compliance and compression in an axial direction.

6. A seal assembly according to claim 1 wherein said frustoconically-shaped seal forms a shallow included angle α with a plane perpendicular to the axis of said rotor and passing through said seal.

7. A seal assembly according to claim 1 wherein said tube is spaced from the opening in one of said wheel and said spacer to define an air gap therebetween, said seal sealing between said air gap and a cavity between said wheel and spacer about said seal assembly.

\* \* \* \* \*